(12) United States Patent
Khair

(10) Patent No.: US 10,801,882 B2
(45) Date of Patent: Oct. 13, 2020

(54) METHODS AND SYSTEM FOR OBTAINING A FORCE MEASUREMENT WITH REDUCED DRIFT EFFECTS

(71) Applicant: General Electric Company, Schenectady, NY (US)

(72) Inventor: Mohammad Mohammad Khair, Whitefish Bay, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 216 days.

(21) Appl. No.: 16/194,093

(22) Filed: Nov. 16, 2018

(65) Prior Publication Data

US 2020/0158560 A1 May 21, 2020

(51) Int. Cl.
| | |
|---|---|
| G01G 3/14 | (2006.01) |
| G01G 23/01 | (2006.01) |
| A61G 7/05 | (2006.01) |
| G01G 23/37 | (2006.01) |
| G01G 3/142 | (2006.01) |
| G01G 19/44 | (2006.01) |

(52) U.S. Cl.
CPC ....... *G01G 23/3714* (2013.01); *A61G 7/0527* (2016.11); *G01G 3/142* (2013.01); *G01G 19/445* (2013.01)

(58) Field of Classification Search
CPC ...... G01G 3/14; G01G 3/1404; G01G 3/1408; G01G 3/142; G01G 19/445; G01G 23/01; G01G 23/3714; A61G 7/0527
See application file for complete search history.

(56) References Cited

U.S. PATENT DOCUMENTS

| | | | | |
|---|---|---|---|---|
| 4,155,263 | A | * | 5/1979 | Frantz .................... G01G 3/145 73/771 |
| 4,261,195 | A | * | 4/1981 | Lockery ................ G01L 1/2268 177/211 |
| 4,691,290 | A | * | 9/1987 | Griffen ................ G01G 3/1414 177/25.13 |
| 5,610,343 | A | * | 3/1997 | Eger ..................... G01G 3/1412 177/210 R |

(Continued)

FOREIGN PATENT DOCUMENTS

| | | |
|---|---|---|
| CN | 106595819 A | 4/2017 |
| EP | 3 205 990 A1 * | 8/2017 ............... G01C 3/14 |

OTHER PUBLICATIONS

PCT application PCT/US2019/060710 filed Nov. 11, 2019, International Search Report/Written Opinion dated May 13, 2020, 12 pages.

*Primary Examiner* — Randy W Gibson
(74) *Attorney, Agent, or Firm* — McCoy Russell LLP

(57) ABSTRACT

Various methods and systems are provided for a drift-compensated force measurement. In one example, a method includes obtaining a single output voltage measurement from a strain gauge of an infant scale, the single output voltage reflective of a weight applied to the scale; obtaining a voltage measurement across each of four resistors of the strain gauge to determine four separate voltage measurements and determining a drift voltage based on the four separate voltage measurements; and outputting a corrected weight value determined based on a difference between the single output voltage and the drift voltage

20 Claims, 5 Drawing Sheets

(56) References Cited

U.S. PATENT DOCUMENTS

| | | | |
|---|---|---|---|
| 6,725,165 B1 * | 4/2004 | Knox | B60N 2/002 |
| | | | 177/144 |
| 7,088,108 B2 | 8/2006 | König et al. | |
| 10,495,529 B2 * | 12/2019 | Lipowski | G01L 1/2281 |
| 2003/0213622 A1 * | 11/2003 | Sakai | B60R 21/01556 |
| | | | 177/208 |
| 2004/0215381 A1 * | 10/2004 | Jitsui | B60R 21/01516 |
| | | | 701/45 |
| 2017/0205272 A1 * | 7/2017 | Zhang | G01B 7/20 |

* cited by examiner

US 10,801,882 B2

METHODS AND SYSTEM FOR OBTAINING A FORCE MEASUREMENT WITH REDUCED DRIFT EFFECTS

FIELD

Embodiments of the subject matter disclosed herein relate to obtaining weight measurements with a strain gauge.

BACKGROUND

Strain gauges are used in a variety of applications to measure changes in a force, such as weight or pressure, applied to an object to which they are coupled. In one example, a scale may include a plurality of strain gauges for measuring weight. In particular, infant scales may employ two or more strain gauges for continuously outputting a weight of the infant. Obtaining accurate weight measurements may include removing an infant from the scale in order to zero (referred to as taring) the scale, and then placing the infant back on the tared scale to receive the weight measurement.

BRIEF DESCRIPTION

In one embodiment, a method comprises obtaining a single output voltage measurement from a strain gauge of a scale, the single output voltage reflective of a weight applied to the scale; obtaining a voltage measurement across each of four resistors of the strain gauge to determine four separate voltage measurements and determining a drift voltage based on the four separate voltage measurements; and outputting a corrected weight value determined based on a difference between the single output voltage and the drift voltage.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 2A:
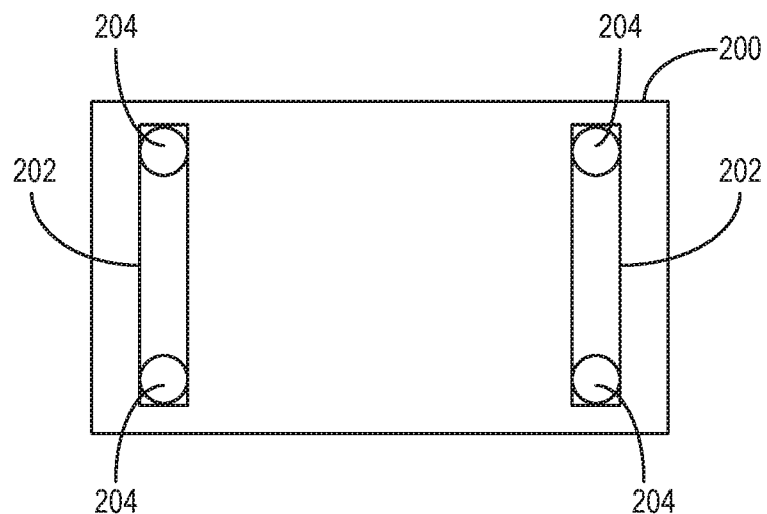
FIGS. 2A-2B show example arrangements of strain gauges on a scale.
Figure 2B:
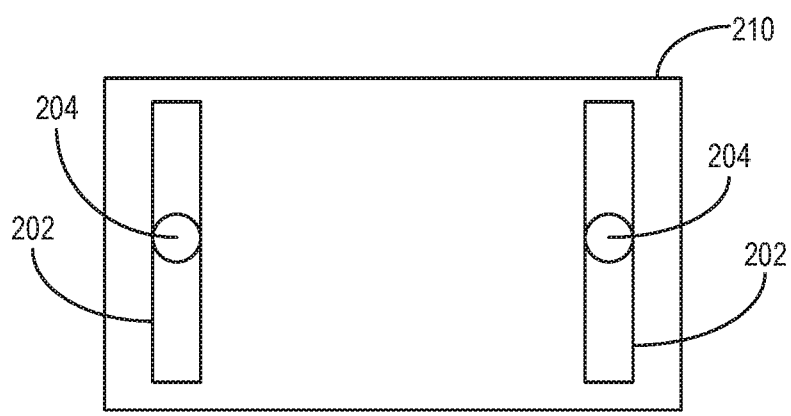
Figure 3:
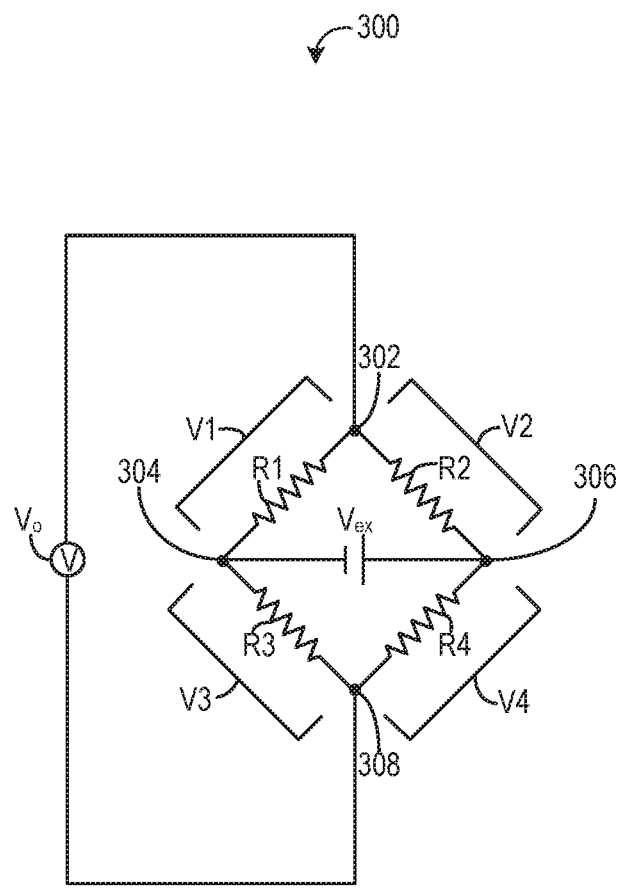
FIG. 3 shows an example of a wheatstone bridge of a strain gauge.

The following description relates to various embodiments of acquiring a drift-compensated force measurement using a strain gauge. An example of a wheatstone bridge of a strain gauge, which include four resistors, is shown in FIG. 3. In one embodiment, one or more strain gauges may be included in a scale, in one of the example arrangements shown in FIGS. 2A-2B. In some embodiments, the scale may be a scale adapted to measure and output a weight of an infant, such as the infant scale system shown in FIG. 1. For example, hospitals may utilize infant scales to obtain an accurate weight of an infant for tracking weight gain, administering appropriate medication dosages, and the like. However, electronic scales may be subject to electrical drift (e.g., the power supply supplying power/voltage to the strain gauge(s) shifting and/or not being stable, or electronic amplifiers drift, or drift to reference voltage provided to analog to digital conversion (ADC) electronics). As a result, the force (e.g., weight) measurements output by the scale may have reduced accuracy. When drifting occurs, and a healthcare provider wants to ensure an accurate weight reading, the scale may be tared to re-zero the scale and remove the drift (the electrical drift). For example, a taring process may include a healthcare provider lifting an infant off the scale and taring the scale (by hitting a "tare" button) to zero the scale (e.g., the weight measurement output by the scale will read zero). The infant is then placed back on the scale. After a duration of time (e.g., 20 seconds) the scale may output a more accurate weight measurement of the infant. This taring process is a manual process that may take several minutes to implement. This process may also cause agitation to the infant. For example, some infants may be sensitive to touch and, especially for infants in a neo-natal unit, touching during this taring process may increase a risk of infection to the infant. Thus, it is desirable to avoid the taring process (or reduce the frequency at which taring is executed) while also obtaining accurate weight measurements.

The inventors herein have recognized the above-described issues with taring and obtaining accurate (e.g., drift-free) force measurements. Additionally, the inventors have developed systems and methods for obtaining weight measurements with increased accuracy (e.g., reduced drift effects) and that result in reducing a frequency of taring. For example, as shown in the example method of FIG. 5, a method for obtaining drift-compensated force (e.g., weight) measurements includes obtaining each of an output voltage measurement from the wheatstone bridge of the strain gauge and individual voltage measurements across each resistor of the wheatstone bridge. In this way, at least four different voltage measurements may be obtained (e.g., acquired) from the strain gauge circuit. The method may further include determining a drift term (e.g., drift voltage) from the voltage measurements across each of the four resistors of the bridge. This drift voltage is then subtracted from the measured or computed output voltage to determine the drift-compensated output voltage which may be used to determine a corresponding force (e.g., weight) value. The method may then include outputting and displaying the drift-compensated (e.g., corrected) weight value to a user. Examples of a drift-compensated output voltage of a strain gauge and a non-drift-compensated output voltage (e.g., the output voltage before subtracting the drift voltage) are shown in the graph presented in FIG. 4. In this way, drift effects on force measurements of a strain gauge may be reduced and taring of scales utilizing the strain gauge(s) may be required less frequently. When used with an infant scale, this method may reduce agitation and infection risk to the infant, while at the same time continuously providing weight measurements with increased accuracy for better weight tracking and medication administration.

Figure 1:
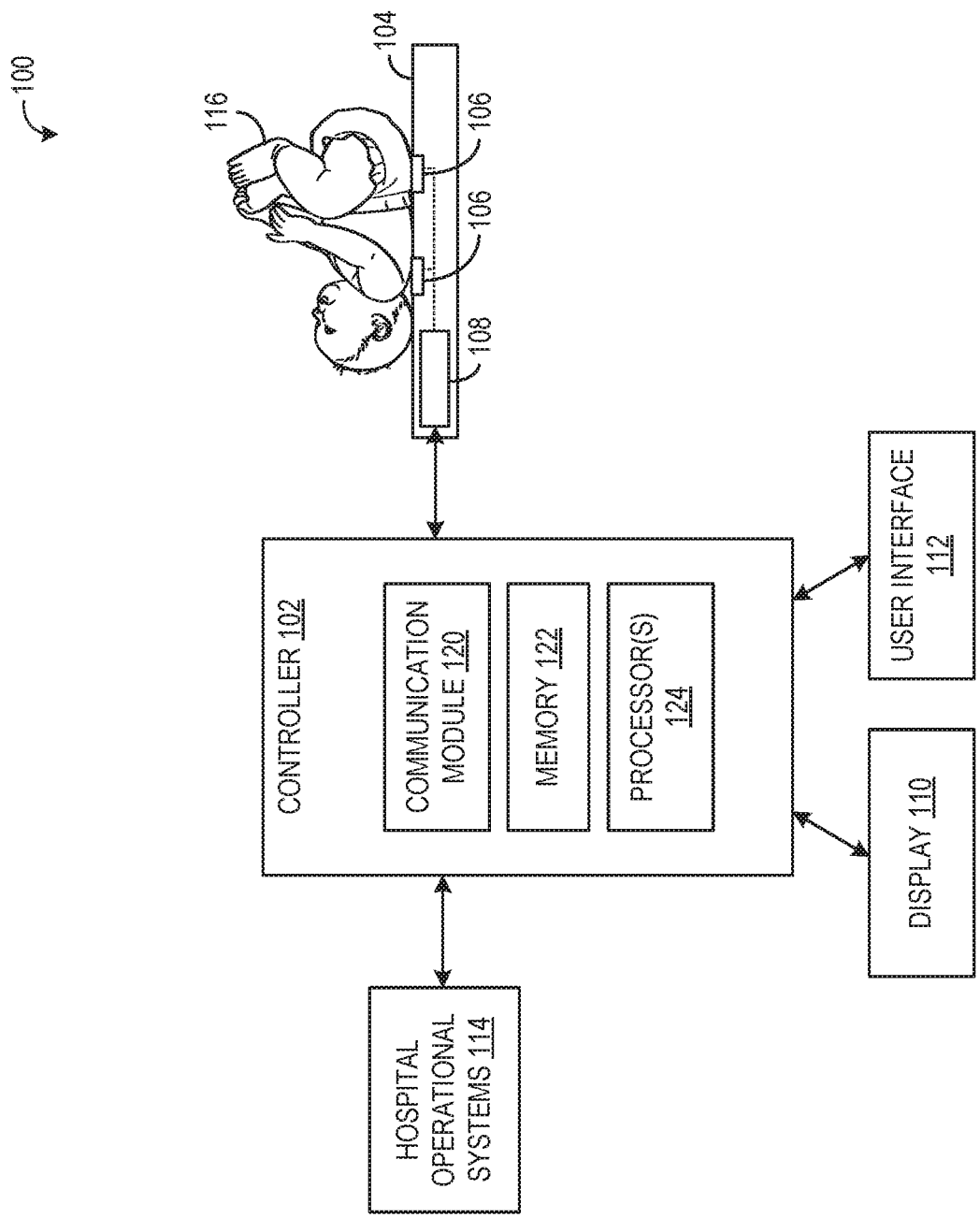
FIG. 1 shows an embodiment of a system for measuring a weight of an infant.

Before further discussion of the approach for obtaining a drift-compensated force measurement from a strain gauge, an example platform in which the methods described herein may be implemented is described. For example, FIG. 1 shows an infant scale system 100 which may be implemented in a medical facility such as a clinic or hospital. System 100 includes a scale (e.g., infant or pediatric scale) 104 upon which an infant 116 is positioned in order to obtain a weight of the infant 116. Scale 104 may be a standalone scale or may be a scale utilized in an incubator or similar device which may be included in a patient's room or part of a neonatal intensive care unit (NICU) or other medical facility unit, in one example.

Scale 104 includes one or more strain gauge sensors (e.g., strain gauges) 106. Example arrangements of the strain gauges 106 on a scale (such as scale 104) are shown in FIGS. 2A-2B and an example electrical circuit that may be used in strain gauges 106 is shown in FIG. 3, as described further below. Scale 104 may include controller 108 (e.g., electronic controller or control unit) that is electrically connected to the strain gauges 106. Controller 108 may receive electrical signals, such as voltage outputs or measurements, from the strain gauges 106 and be communication with controller 102. In some embodiments, controller 108 may be part of controller 102 and/or the elements of controller 102 may be included in controller 108 (or vice versa). As one example, controller 108 may communicate the electrical signals received from the strain gauges 106 to controller 102 (via a communication module, in one example) for processing. Controller 102 may be part of scale 104, may be included in an incubator or similar device in which scale 104 is included, and/or be part of an electronic control unit separate from scale 104.

Controller 102 may output weight measurements acquired from scale 104 for display on a display 110. Display 110 may be located fully or partially within the environment of scale 104 (e.g., may be part of scale 104 or part of an incubator in which scale 104 is included). In an alternative embodiment, the display 110 is located outside of the environment of scale 104. Display 110 is operated to visually present the acquired weight information to a clinician.

In particular, controller 102 includes a communication module 120, memory 122, and processor(s) 124. Controller 102 is operatively coupled to display 110 and a user interface 112. User interface 112 may include a graphical user interface presented on a touch screen, such as display 110, and/or user-actuated devices such as a mouse, keyboard, buttons, switches, etc. User interface 112 may additionally or alternatively be part of scale 104 or part of an incubator in which scale 104 is positioned. User input sent to/received by controller 102 may be entered via user interface 112.

Controller 102 may be communicatively coupled to hospital operational systems 114. Hospital operational systems 114 may store and/or control a variety of hospital-, care provider-, and patient-related information, including but not limited to patient admission information (including date of admission and location of the patient within the medical facility), patient care protocols and workflows, and care provider information including which care providers are monitoring/treating which patients.

Controller 102 includes communication module 120, memory 122, and processor(s) 124 to send and receive communications, generate and output graphical user interfaces, send and receive medical data, send controls to microenvironment, and other tasks. Further, in some examples, controller 102 may store and execute instructions for obtaining (e.g., continuously acquiring in real-time) voltage outputs from the strain gauge(s) 106 of scale 104 and processing the received voltages to determine a drift-compensated weight measurement which may then be output and presented to a user via display 110.

Communication module 120 facilitates transmission of electronic data within and/or among one or more systems. Communication via communication module 120 can be implemented using one or more protocols. In some examples, communication via communication module 120 occurs according to one or more standards (e.g., Digital Imaging and Communications in Medicine (DICOM), Health Level Seven (HL7), ANSI X12N, etc.). Communication module 120 can be a wired interface (e.g., a data bus, a Universal Serial Bus (USB) connection, etc.) and/or a wireless interface (e.g., radio frequency, infrared, near field communication (NFC), etc.). For example, communication module 120 may communicate via wired local area network (LAN), wireless LAN, wide area network (WAN), etc. using any past, present, or future communication protocol (e.g., BLUETOOTH™, USB 2.0, USB 3.0, etc.).

Memory 122 one or more data storage structures, such as optical memory devices, magnetic memory devices, or solid-state memory devices, for storing programs and routines executed by processor(s) 124 to carry out various functionalities disclosed herein. Memory 122 may include any desired type of volatile and/or non-volatile memory such as, for example, static random access memory (SRAM), dynamic random access memory (DRAM), flash memory, read-only memory (ROM), etc. Processor(s) 124 may be any suitable processor, processing unit, or microprocessor, for example. Processor(s) 124 may be a multiprocessor system, and, thus, may include one or more additional processors that are identical or similar to each other and that are communicatively coupled via an interconnection bus.

As used herein, the terms "sensor," "system," "unit," or "module" may include a hardware and/or software system that operates to perform one or more functions. For example, a sensor, module, unit, or system may include a computer processor, controller, or other logic-based device that performs operations based on instructions stored on a tangible and non-transitory computer readable storage medium, such as a computer memory. Alternatively, a sensor, module, unit, or system may include a hard-wired device that performs operations based on hard-wired logic of the device. Various modules or units shown in the attached figures may represent the hardware that operates based on software or hard-wired instructions, the software that directs hardware to perform the operations, or a combination thereof.

"Systems," "units," "sensors," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

While not specifically shown in FIG. 1, additional devices described herein (devices associated with hospital operational systems 114, clinician devices, etc.) may likewise include user input devices, memory, processors, and communication modules/interfaces similar to communication module 120, memory 122, and processor(s) 124 described above, and thus the description of communication module 120, memory 122, and processor(s) 124 likewise applies to the other devices described herein.

Turning now to FIGS. 2A-2B, example arrangements of one or more strain gauges on a scale are shown. The scales shown in FIGS. 2A-2B may be used as scale 104 in system 100 of FIG. 1, in one example. Additionally, the strain gauges 204 illustrated in FIGS. 2A-2B may the same or similar to strain gauges 106 shown in FIG. 1 and may include a wheatstone bridge circuit, such as the circuit shown in FIG. 3, as described further below.

FIG. 2A shows a first example of a scale 200 including two beams 202, one arranged at either end of the scale 202. However, in alternate embodiments, scale 200 may include more than two beams 202 and/or beams 202 may be arranged at different positions in scale 200, relative to a length of scale 200. Each of the beams 202 includes two strain gauges 204, one positioned at either end of the beam. In this way, scale 200 includes four strain gauges. In an alternate embodiment, as shown in FIG. 2B, a scale 210 may include two beams 202, each with a single (e.g., only one) strain gauge 204 positioned at approximately a center of each beam 202. In this way, scale 210 includes two strain gauges. The positioning and number of the strain gauges 204 on a scale may be adjusted for the type of scale in order to reduce mechanical drift (which is different than electrical drift, as addressed herein).

FIG. 3 shows an example of an electrical circuit including a wheatstone bridge 300 that may be implemented in a strain gauge, such as strain gauges 106 shown in FIG. 1 and/or 204 shown in FIGS. 2A-2B. A strain gauge is a device which includes an electrical circuit adapted to measure strain. An amount of deformation that an object or material experiences due to an applied force is called "strain". There are different types of strain, including axial, bending, shear, and torsional strain. Bending strain measures a stretch on one side of a material (e.g., a beam) and a contraction on an opposite side of the material (e.g., beam) due to a linear force applied in the vertical direction. For example, when an infant is placed on a scale, a linear force is applied in the vertical direction (into the surface of the scale) and bending strain occurs at the beams of the scale which include the strain gauge(s). A strain gauge may measure this bending, or other type of, strain. For example, the strain gauge's electrical resistance may vary in proportion to the amount of strain applied to the device. In order to measure small changes in resistance, strain gauge configurations utilize a wheatstone bridge, such as wheatstone bridge 300 shown in FIG. 3.

As shown in FIG. 3, wheatstone bridge 300 includes a network of four resistive arms with an excitation (e.g., supply) voltage, Vex, supplied across the bridge. In particular, bridge 300 includes four nodes (302, 304, 306, and 308) formed by connecting the four resistive arms. The four resistive arm are made up by a first resistor R1, second resistor R2, third resistor R3, and fourth resistor R4. First resistor R1 and second resistor R2 are coupled to first node 302, first resistor R1 and third resistor R3 are coupled to second node 304, second resistor R2 and fourth resistor R4 are coupled to third node 306, and third resistor R3 and fourth resistor R4 are coupled to fourth node 308. The excitation voltage Vex is applied between second node 304 and third node 306. The wheatstone bridge 300 is the electrical equivalent to two parallel voltage divider circuits. The output of the wheastone bridge, referred to as the output voltage, $V_o$, is measured between first node 302 and fourth node 308.

The output voltage $V_o$ is reflective of weight forces applied to the strain gauge, in one example. The resistance of the bridge 300 varies based on bending of the strain gauge. For example, the resistance of first resistor R1 and fourth resistor R4 increase due to weight applied to the strain gauge, thereby increasing the first voltage V1 measured across the first resistor R1 and the fourth voltage V4 measured across the fourth resistor R4. Similarly, the resistance of the second resistor R2 and third resistor R3 decrease due to weight applied to the strain gauge, thereby decreasing the second voltage V2 measured across second resistor R2 and the third voltage V3 measured across the third resistor R3.

A standard equation representing the output voltage $V_o$ of the wheatstone bridge 300 is shown by equation 1, below.

$$V_o = V_{ex} * \left[ \frac{R1}{R1+R3} - \frac{R2}{R2+R4} \right] \quad \text{(Equation 1)}$$

Thus, when the bridge 300 is balanced, the resistances in the above equation cancel out and the output voltage $V_o$ is zero. However, any change in resistance in any arm of the bridge results in a nonzero output voltage. The acquired output voltage $V_o$ may then be used to determine a corresponding weight value (when the strain gauge is used in a scale, for example).

When the bridge 300 is calibrated and balanced, the sum of the resistances of the bridge 300 should be zero. For example, because two of the resistances are increasing (R1 and R4) and two of the resistances are decreasing (R2 and R3), the sum of a balanced bride, not experiencing a drift in the power supply, will be zero. However, when the bridge becomes unbalanced due to a drift in the power supply (e.g., electrical drift), the sum of these resistances, represented in the equation below, will not be zero $$R_{drift}=(R1+R4)-(R2+R3) \quad \text{(Equation 2)}$$

In the above equation, the drift resistance, Rat, will be non-zero for an unbalanced bridge that is subject to electrical drift.

The inventors herein have recognized that by measuring the voltage across each individual resistor of bridge 300, while measuring the output voltage $V_o$, a drift voltage, $V_{drift}$, representative of the amount of measured voltage due to drift in the output voltage $V_o$ may be determined. For example, after measuring each of the first voltage V2, second voltage V2, third voltage V3, and fourth voltage V4 of the bridge 300, as shown in FIG. 3, the drift voltage $V_{drift}$ may be determined according to the following equation:

$$V_{drift}=[(V1+V4)_{now}-(V1+V4)_{baseline}]-[(V2+V3)_{now}-(V2+V3)_{baseline}] \quad \text{(Equation 3)}$$

In the above equation, baseline voltages across each of the resistors are subtracted from currently measured voltages across each of the resistors. The baseline voltages may be voltages across each resistor, determined upon zeroing the strain gauge, when no force (e.g., weight) is applied to the strain gauge, such as during a taring operation when the strain gauge is used in a scale. Thus, the baseline voltage values may be acquired less frequently and used as the baseline voltage values as the actual voltages across the resistors change in response to changing applied strain.

As described further below with reference to FIG. 5, the drift voltage $V_{drift}$ determined from Equation 3 may then be subtracted from the acquired output voltage $V_o$ (e.g., measured from the bridge 300, at $V_o$) in order to determine a drift-compensated voltage $V_{o\_nodrift}$, as represented by Equation 4 below.

$$V_{o\_nodrift} = V_o - V_{drift} \qquad \text{(Equation 4)}$$

In the above equation, $V_{o\_nodrift}$ represents the drift-compensated output voltage and $V_o$ represents the non-drift-compensated output voltage (e.g., the output voltage acquired between first node 302 and fourth node 308, without having electrical drift effects removed).

Figure 4:
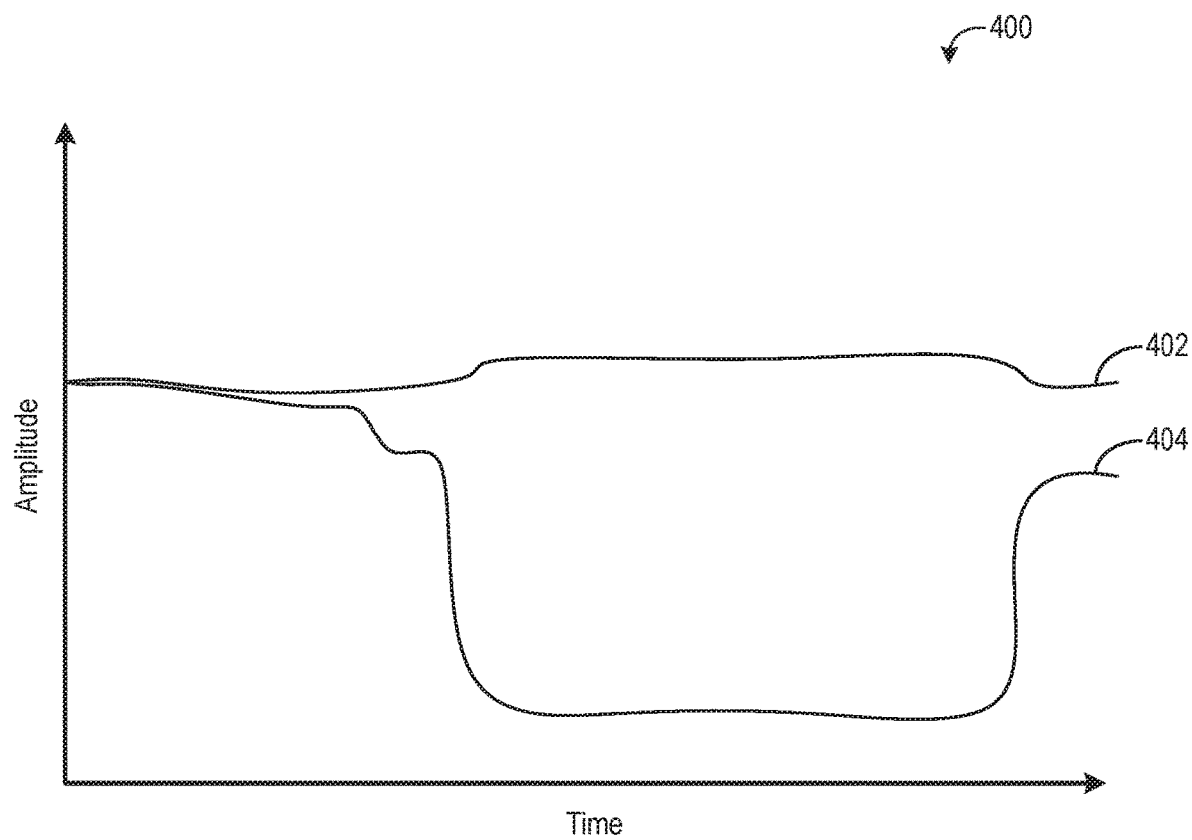
FIG. 4 shows a graph of example drift-compensated and non-drift-compensated measurements of a strain gauge.

FIG. 4 shows a graph 400 of example drift-compensated and non-drift-compensated voltage measurements of a strain gauge. For example, graph 400 includes an example non-drift-compensated voltage measurement $V_o$ at plot 404 and an example drift-compensated voltage measurement $V_{o\_nodrift}$ at plot 402, where time is represented on the x-axis and amplitude is represented on the y-axis. As discussed above with reference to FIG. 3, the non-drift-compensated voltage measurement $V_o$ may be the output voltage measurement measured from bridge 300 (or a similar bridge of a strain gauge) which is affected by drift and has not been corrected for electrical drift effects. As such, the non-drift-compensated voltage measurement $V_o$ shown at plot 404 begins to decrease in amplitude over time due to electrical drift effects. In contrast, the drift-compensated voltage measurement $V_{o\_nodrift}$ shown at plot 402, which has been compensated for drift (e.g., the drift voltage, $V_{drift}$, discussed above has been removed), remains more stable and does not dip when the non-drift-compensated voltage measurement $V_o$ does in graph 400. In this way, by removing the drift voltage from the acquired output voltage, a more accurate output voltage, indicative of the force (e.g., weight) applied to the strain gauge may be determined.

Figure 5:
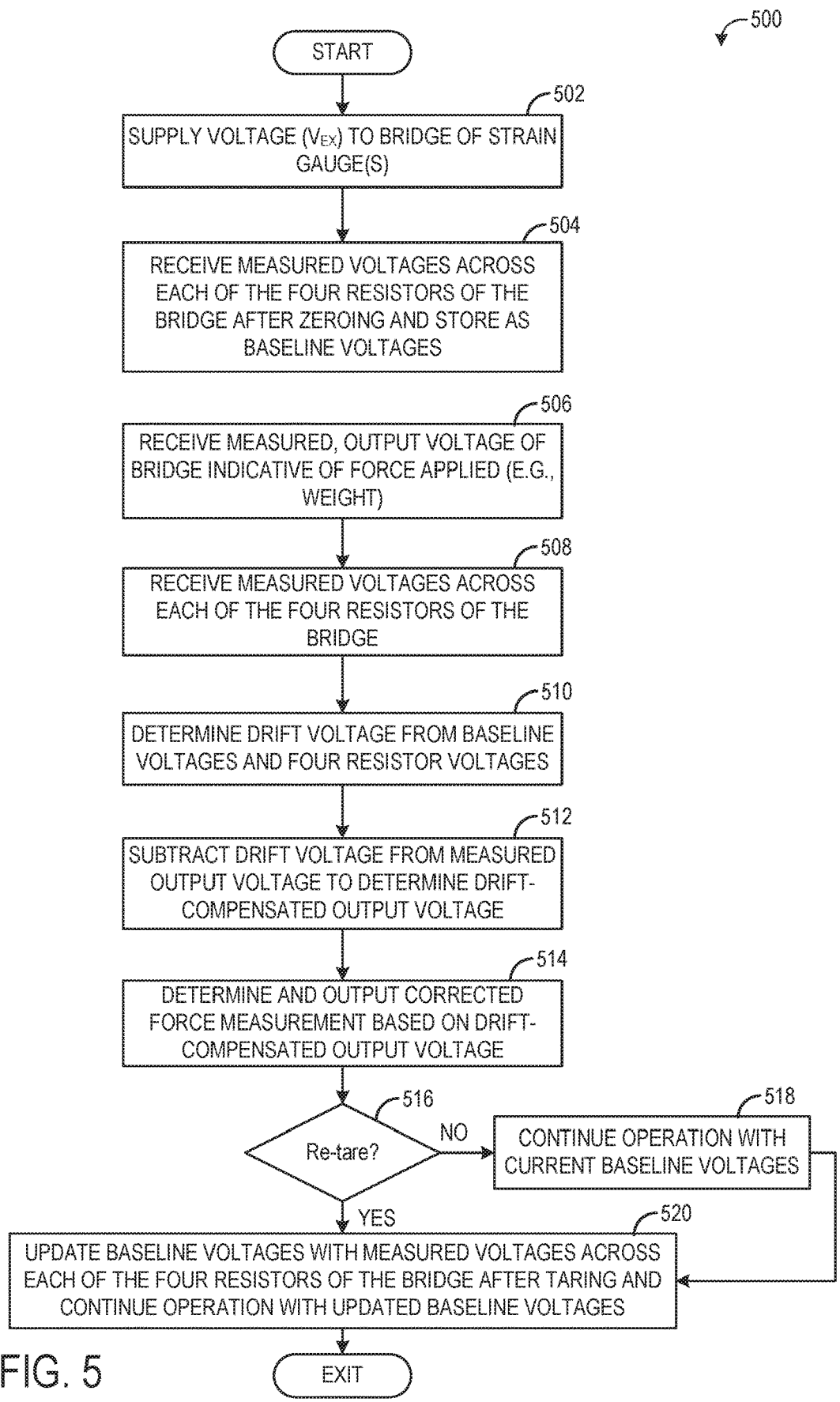
FIG. 5 shows a flow chart of an example method for outputting a drift-compensated force measurement based on individual voltage measurements across each resistor of a wheatstone bridge of a strain gauge.

Turning now to FIG. 5, a flow chart of an example method 500 for outputting a drift-compensated force measurement based on individual voltage measurements across each resistor of a wheatstone bridge of a strain gauge is shown. In one example, the wheatstone bridge may be the same or similar to the wheatstone bridge 300 shown in FIG. 3, as discussed above. Further, in some embodiments, the strain gauge (or gauges) may be included in a scale, such as the infant scale 104 including strain gauges 106 shown in FIG. 1. Additionally, method 500 may be stored as instructions in non-transitory memory of a controller, such as a controller 102 and/or 108 shown in FIG. 1, and executed by the controller in conjunction with the strain gauges (e.g., strain gauge sensors).

At 502, the method includes supplying a supply (e.g., excitation) voltage, $V_{ex}$, to the bridge of the strain gauge(s). For example, if a device includes more than one strain gauge, the method at 502 may include supplying the excitation voltage $V_{ex}$ across the bridge of each strain gauge. As explained above, the excitation voltage $V_{ex}$ may be supplied between a first two nodes of the bridge (e.g., between nodes 304 and 306 shown in FIG. 3), which are different than the two nodes across which the output voltage $V_o$ is measured, as explained above and further below. The excitation voltage $V_{ex}$ may provide power to the bridge circuit of the strain gauge, thereby allowing voltages to be measured across different nodes (e.g., points) of the bridge, as discussed further below.

At 504, the method includes receiving measured voltages across each of the four resistors of the bridge of the strain gauge(s) (e.g., resistors R1, R2, R3, and R4 of bridge 300 shown in FIG. 3) after zeroing and then storing the received voltages as baseline voltages. As one example, during operation of a scale (e.g., infant scale), prior to placing an infant on the scale, or after removing the infant from the scale, the user may select a "taring" user input on or electrically coupled with the scale in order to "zero" or "tare" the scale. In this way, a baseline voltage across each resistor (e.g., $V1_{baseline}$, $V2_{baseline}$, $V3_{baseline}$, and $V4_{baseline}$) may be acquired (e.g., obtained) from the bridge circuit (e.g., between the corresponding nodes of the bridge circuit, as shown in FIG. 3) for a condition at which no (e.g., essentially zero) force is being applied to the strain gauge. In the embodiment of the infant scale, no weight is being applied to the scale so no bending strain is being applied to the strain gauges of the scale. Thus, a baseline voltage measurement may be acquired (e.g., an electrical voltage signal may sent to and received at the controller from the bridge circuit) across each resistor of each strain gauge and may be stored in the memory of the controller. After the taring process, a user may then place the infant (or patient) back on the scale to acquire a weight measurement.

At 506, the method includes receiving a measured, output voltage $V_o$ of the bridge which may be indicative of the force applied to the strain gauge (e.g., weight of the infant on the scale). As explained above with reference to FIG. 3, the output voltage $V_o$ may be measured between two nodes of the bridge, where the two nodes are different than the two nodes which the supply voltage $V_{ex}$ is applied to. Each of the two nodes between which the output voltage $V_o$ is measured are coupled to two different resistors. In this way, the output voltage $V_o$ may change as the resistance of each of the resistors changes (due to increasing or decreasing strain applied to the strain gauge, for example). The output voltage $V_o$ may be a standard voltage output of the bridge and may be used by the controller to determine a force applied to the strain gauge (or a weight applied to the scale including the strain gauge, in one example). However, this output voltage $V_o$ may be affected by electrical drift and thus, may have reduced accuracy as drift increases over time. Since such output voltage measurement is including aggregate effects of drift components, it is not possible to remove such drift from it without access to the individual voltage values on each of the strain bridge resistive components R1, R2, R3, and R4. The output voltage can also be computed using the resistive values and the excitation voltage using Equation 1, as presented above.

Therefore, at 508, the method includes receiving a measured voltage across each of the four resistors of the bridge. For example, the method at 508 may include obtaining (e.g., acquiring in real-time from the bridge via the controller) first voltage V1 measured across first resistor R1 (e.g., between nodes 302 and 304 in FIG. 3), second voltage V2 measured across second resistor R2 (e.g., between nodes 302 and 306 in FIG. 3), third voltage V3 measured across third resistor R3 (e.g., between nodes 304 and 308 in FIG. 3), and fourth voltage V4 measured across fourth resistor R4 (e.g., between nodes 306 and 308 in FIG. 3). In this way, four individual voltages (one for each resistor) for the bridge of each strain gauge is acquired at 508. The voltages acquired at 508 may be acquired in real-time (and thus may be "current" voltage values across the four resistors), a duration after receiving the baseline voltages (e.g., a duration after taring). As explained further below, the voltage across each resistor may be continuously acquired, in real-time, during operation of the strain gauge(s).

At 510, the method includes determining the drift voltage from the acquired baseline voltages (obtained at 504) and the four resistor voltages (obtained at 508). For example, at 510, the controller may process the stored baseline voltages (for each resistor of the strain gauge bridge) and the four individual resistor voltages to determine the drift voltage according to a mathematical relationship (e.g., function) stored at the controller. The stored relationship may be the drift voltage equation presented above at equation 3. In this way, the controller may determine the drift voltage as a function of the four stored baseline voltages (one corresponding to each resistor) and the four acquired voltages (one corresponding to each resistor). As explained further below, the drift voltage may be continuously determined, in real-time, as the acquired individual resistor voltages change and are acquired. However, the same stored baseline voltages for the resistors may continue to be used with the newly updated acquired resistor voltages, until new baseline values are requested (e.g., via taring, as explained further below).

At 512, the method includes subtracting the drift voltage determined at 510 from the measured output voltage (obtained at 506) to determine a drift-compensated output voltage. For example, the controller may subtract the determined drift voltage from the measured output voltage according to a relationship stored in the controller, where the relationship is the drift-compensated output voltage equation presented above at equation 4.

At 514, the method includes determining and outputting a corrected force measurement that corresponds to the drift-compensated output voltage, $V_{o\_nodrift}$. For example, the method at 514 may include demining a force value (e.g., pressure or weight value) that is based on and corresponds to the drift-compensated output voltage, $V_{o\_nodrift}$ of the strain gauge. As one example, the controller may look-up the corresponding force value in a look-up table stored in memory of the controller, using the drift-compensated output voltage, $V_{o\_nodrift}$ as the input to the table. In another example, the controller may determine the corresponding force value as a function of the drift-compensated output voltage, $V_{o\_nodrift}$, according to a function or relationship stored in memory of the controller. For example, in the case of the infant scale, the drift-compensated output voltage, $V_{o\_nodrift}$ may represent the weight or change in weight of an infant on the scale. Thus, a weight measurement or value, representing the actual weight of the infant on the scale, may be directly determined as a function of the drift-compensated output voltage, $V_{o\_nodrift}$ determined from one or more strain gauges of the scale. If the scale includes more than one strain gauge (e.g., two or four, as shown in FIGS. 2A-2B), the method at 514 may include determining the corresponding weight value as a function of the drift-compensated output voltage, $V_{o\_nodrift}$ for each of the strain gauges (e.g., using two or four drift-compensated output voltage values). In one example, outputting the corrected (e.g., drift-compensated) force (e.g., weight or pressure) value includes displaying the force value via a display operably coupled (e.g., through wired or wireless electrical connections) to the controller. In one embodiment, the display may be a display of an infant scale or an incubator or similar device including the scale which includes the strain gauge(s). In another embodiment, outputting the corrected, drift-compensate force value includes communicating, via a wired or wireless electrical connection, the drift compensated force measurement to a base weight display monitor (e.g., a display of the infant scale or operably coupled to the scale) or to an electronic records storage system of a database or system in electronic communication with the controller (e.g., such as operational systems 114 shown in FIG. 1 or an alternate electronic records database).

At 516, the method includes determining whether a request to re-zero the strain gauge, or re-tare a scale including the strain gauge(s) has been requested. For example, the controller may receive an electrical signal from a user input device electrically coupled with a device in which the strain gauge is installed indicating that the strain gauge should be re-zeroed. Re-zeroing the strain gauge (referred to as re-taring in scale applications) may include taking new baseline voltage values, which may remove any accumulated electrical drift from the voltage measurements. For example, the controller may receive an electrical input from a user interface of an infant scale indicating that a user has requested to tare the scale. If no re-taring or re-zeroing signal is received, the method continues to 518 to continue operation of the strain gauge using the current baseline voltages (e.g., current baseline voltage for each resistor of the strain gauge). In this way, for newly acquired resistor voltages, the same (previously acquired) baseline voltages may be used to determine the drift voltage and drift-compensated output voltage.

Alternately at 516, if the method determines there is a request to re-zero or re-tare the strain gauge (or the device in which the strain gauge is installed), the method continues to 520 to update the stored individual resistor baseline voltages with newly acquired (e.g., measured) voltages, one across each of the four resistors of the bridge, after taring (or zeroing), and continuing operation using the updated baseline voltages. Method 500 may then end.

However, method 500 may be continuously executed and repeated in real-time. For example, the method from 504-514 may be continuously repeated so that real-time force measurements, which have been drift-compensated (e.g., with a portion of the measured voltage due to drift removed), are determined and output and displayed to a user. In this way, voltage measurements obtained in real-time may be used to remove electrical drift contributions and display a more accurate force value (e.g., weight value). The technical effect of obtaining a single output voltage measurement from a strain gauge of a scale, the single output voltage reflective of a weight applied to the scale; obtaining a voltage measurement across each of four resistors of the strain gauge to determine four separate voltage measurements and determining a drift voltage based on the four separate voltage measurements; and outputting a corrected weight value determined based on a difference between the single output voltage and the drift voltage is presenting a user with a more accurate (e.g., without electrical drift effects) weight value which may then be used to track weight gain of a patient and administer correct dosages (according to the weight value). As a result, infants may be better monitored and taken care of in a medical facility, thereby increasing a likelihood of positive health outcomes. Further, by removing the drift voltage from the output voltage measurement, the scale may require taring less often, thereby allowing an infant to remain on the scale for longer period of time and, as a result, decreasing a risk of infection and agitation to the infant.

As one embodiment, a method includes obtaining a single output voltage measurement from a strain gauge of a scale, the single output voltage reflective of a weight applied to the scale; obtaining a voltage measurement across each of four resistors of the strain gauge to determine four separate voltage measurements and determining a drift voltage based on the four separate voltage measurements; and outputting a corrected weight value determined based on a difference between the single output voltage and the drift voltage. In a first example of the method, the method further includes storing the four separate voltage measurements as baseline voltages in response to receiving a first taring input indicating a request to zero the scale. A second example of the method optionally includes the first example and further includes, wherein determining the drift voltage includes subtracting each stored baseline voltage from a corresponding one of the four separate voltage measurements, for each of the four resistors. A third example of the method optionally includes one or more of the first and second examples and further includes updating the stored baseline voltages upon receiving a subsequent, second taring input, a duration after receiving the first taring input, indicating a request to re-zero the scale and, following receiving the second taring input, determining the drift voltage based on the updated, stored baseline voltages and newly obtained voltage measurements across each of the four resistors. A fourth example of the method optionally includes one or more of the first through third examples and further includes, wherein obtaining the voltage measurement across each of four resistors of the strain gauge to determine four separate voltage measurements includes obtaining the voltage measurement across each of the four resistors at the same time as obtaining the single output voltage measurement, each of the four separate voltage measurements and the single output voltage measurement taken between a different two points on the strain gauge. A fifth example of the method optionally includes one or more of the first through fourth examples and further includes, wherein the strain gauge includes a wheatstone bridge circuit including the four resistors with a node arranged between each set of two adjacently arrange resistors, the wheatstone bridge circuit having four nodes. A sixth example of the method optionally includes one or more of the first through fifth examples and further includes, wherein obtaining the single output voltage measurement includes measuring the single output voltage between a first node and second node of the four nodes and further comprising supplying an excitation voltage to the wheatstone bridge circuit between a third node and fourth node of the four nodes. A seventh example of the method optionally includes one or more of the first through sixth examples and further includes, wherein outputting the corrected weight value includes continuously outputting the corrected weight value to a display. An eighth example of the method optionally includes one or more of the first through seventh examples and further includes, wherein the display is a display of the scale and wherein the scale is an infant scale.

As another embodiment, a method includes obtaining a force measurement from a strain gauge including a wheatstone bridge; receiving individual voltage measurements across each of four resistors of the wheatstone bridge; determining a drift term based on a sum of the individual voltage measurements for the four resistors; and outputting to a display a corrected force measurement, the corrected force measurement obtained by subtracting the determined drift term from the received force measurement. In a first example of the method, obtaining the force measurement includes determining the force measurement from a output voltage received from the wheatstone bridge, the output voltage measured across two points of the wheatstone bridge, a first point of the two points coupled to a first resistor and third resistor of the four resistors and a second point of the two points coupled to a second resistor and fourth resistor of the four resistors. A second example of the method optionally includes the first example and further includes supplying a supply voltage to the wheatstone bridge via applying the supply voltage across two different points of the wheatstone bridge, a first point of the two different points coupled to the first resistor and second resistor and a second point of the two different points coupled to the third resistor and fourth resistor. A third example of the method optionally includes one or more of the first and second examples and further includes storing the received individual voltage measurements across each of the four resistors as baseline voltages in response to receiving an initial taring input and determining the drift term based on subsequently received individual voltage measurements and the stored baseline voltages. A fourth example of the method optionally includes one or more of the first through third examples and further includes, wherein determining the drift term includes determining the drift term based on the received individual voltage measurements and the baseline voltages, where the same baseline voltages are used even as the received individual voltage measurements change, until a second taring input is received. A fifth example of the method optionally includes one or more of the first through fourth examples and further includes, wherein the corrected force measurement is a weight and the wheatstone bridge is coupled to a beam of an infant scale.

As yet another embodiment, a system for continuously measuring a weight of an infant includes: a display; and a control unit communicatively coupled to the display and including instructions stored in memory executable by a processor of the control unit to: acquire an output voltage from a strain gauge of a scale, the strain gauge including a wheatstone bridge with four resistors, the output voltage indicative of a change in force applied to the scale; acquire four individual voltages, each of the four individual voltages acquired across a different one of the four resistors; determine a drift voltage from the acquired four individual voltages; determine a drift-compensated weight value based on a difference between the acquired output voltage and the determined drift voltage; and displaying the determined drift-compensated weight value via the display. In a first example of the system, the instructions are further executable by the processor to: determine a baseline voltage across each of the four resistors in response to receiving a taring input requesting that the scale is tared and, following receiving the taring input, subtracting the baseline voltage for each of the four resistors from a corresponding one of the acquired four voltages to determine the drift voltage. A second example of the system optionally includes the first example and further includes, wherein the instructions are further executable by the processor to: supply an excitation voltage to a first two nodes of the wheatstone bridge while the output voltage is acquired from a different, second two nodes of the wheatstone bridge. A third example of the method optionally includes one or more of the first and second examples and further includes, wherein the scale is an infant scale. A fourth example of the method, wherein the four individual voltages are acquired at the same time as the output voltage.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    obtaining a single output voltage measurement from a strain gauge of a scale, the single output voltage reflective of a weight applied to the scale;
    obtaining a voltage measurement across each of four resistors of the strain gauge to determine four separate voltage measurements and determining a drift voltage based on the four separate voltage measurements; and
    outputting a corrected weight value determined based on a difference between the single output voltage and the drift voltage.

2. The method of claim 1, further comprising storing the four separate voltage measurements as baseline voltages in response to receiving a first taring input indicating a request to zero the scale.

3. The method of claim 2, wherein determining the drift voltage includes subtracting each stored baseline voltage from a corresponding one of the four separate voltage measurements, for each of the four resistors.

4. The method of claim 3, further comprising updating the stored baseline voltages upon receiving a subsequent, second taring input, a duration after receiving the first taring input, indicating a request to re-zero the scale and, following receiving the second taring input, determining the drift voltage based on the updated, stored baseline voltages and newly obtained voltage measurements across each of the four resistors.

5. The method of claim 1, wherein obtaining the voltage measurement across each of four resistors of the strain gauge to determine four separate voltage measurements includes obtaining the voltage measurement across each of the four resistors at the same time as obtaining the single output voltage measurement, each of the four separate voltage measurements and the single output voltage measurement taken between a different two points on the strain gauge.

6. The method of claim 1, wherein the strain gauge includes a wheatstone bridge circuit including the four resistors with a node arranged between each set of two adjacently arrange resistors, the wheatstone bridge circuit having four nodes.

7. The method of claim 6, wherein obtaining the single output voltage measurement includes measuring the single output voltage between a first node and second node of the four nodes and further comprising supplying an excitation voltage to the wheatstone bridge circuit between a third node and fourth node of the four nodes.

8. The method of claim 1, wherein outputting the corrected weight value includes continuously outputting the corrected weight value to a display.

9. The method of claim 8, wherein the display is a display of the scale and wherein the scale is an infant scale.

10. A method, comprising:
    obtaining a force measurement from a strain gauge including a wheatstone bridge;
    receiving individual voltage measurements across each of four resistors of the wheatstone bridge;
    determining a drift term based on a sum of the individual voltage measurements for the four resistors; and
    outputting to a display a corrected force measurement, the corrected force measurement obtained by subtracting the determined drift term from the received force measurement.

11. The method of claim 10, wherein obtaining the force measurement includes determining the force measurement from a output voltage received from the wheatstone bridge, the output voltage measured across two points of the wheatstone bridge, a first point of the two points coupled to a first resistor and third resistor of the four resistors and a second point of the two points coupled to a second resistor and fourth resistor of the four resistors.

12. The method of claim 11, further comprising supplying a supply voltage to the wheatstone bridge via applying the supply voltage across two different points of the wheatstone bridge, a first point of the two different points coupled to the first resistor and second resistor and a second point of the two different points coupled to the third resistor and fourth resistor.

13. The method of claim 10, further comprising storing the received individual voltage measurements across each of the four resistors as baseline voltages in response to receiving an initial taring input and determining the drift term based on subsequently received individual voltage measurements and the stored baseline voltages.

14. The method of claim 13, wherein determining the drift term includes determining the drift term based on the received individual voltage measurements and the baseline voltages, where the same baseline voltages are used even as the received individual voltage measurements change, until a second taring input is received.

15. The method of claim 11, wherein the corrected force measurement is a weight and the wheatstone bridge is coupled to a beam of an infant scale.

16. A system for continuously measuring a weight of an infant, comprising:
    a display; and
    a control unit communicatively coupled to the display and including instructions stored in memory executable by a processor of the control unit to:
        acquire an output voltage from a strain gauge of a scale, the strain gauge including a wheatstone bridge with four resistors, the output voltage indicative of a change in force applied to the scale;
        acquire four individual voltages, each of the four individual voltages acquired across a different one of the four resistors;
        determine a drift voltage from the acquired four individual voltages;
        determine a drift-compensated weight value based on a difference between the acquired output voltage and the determined drift voltage; and
        displaying the determined drift-compensated weight value via the display.

17. The system of claim 16, wherein the instructions are further executable by the processor to: determine a baseline voltage across each of the four resistors in response to receiving a taring input requesting that the scale is tared and, following receiving the taring input, subtracting the baseline voltage for each of the four resistors from a corresponding one of the acquired four voltages to determine the drift voltage.

18. The system of claim 16, wherein the instructions are further executable by the processor to: supply an excitation voltage to a first two nodes of the wheatstone bridge while the output voltage is acquired from a different, second two nodes of the wheatstone bridge.

19. The system of claim 16, wherein the scale is an infant scale.

20. The system of claim 16, wherein the four individual voltages are acquired at the same time as the output voltage.

* * * * *